(12) United States Patent
Hu et al.

(10) Patent No.: US 10,674,416 B2
(45) Date of Patent: Jun. 2, 2020

(54) HANDOVER BETWEEN E-UTRAN AND WLAN

(71) Applicant: Alcatel Lucent, Nozay (FR)

(72) Inventors: Zhiyuan Hu, Shanghai (CN); Zhigang Luo, Shanghai (CN); Xueqiang Yan, Shanghai (CN)

(73) Assignee: Alcatel Lucent, Nozay (FR)

( * ) Notice: Subject to any disclaimer, the term of this patent is extended or adjusted under 35 U.S.C. 154(b) by 42 days.

(21) Appl. No.: 15/776,965

(22) PCT Filed: Nov. 18, 2015

(86) PCT No.: PCT/CN2015/094911
§ 371 (c)(1),
(2) Date: May 17, 2018

(87) PCT Pub. No.: WO2017/084043
PCT Pub. Date: May 26, 2017

(65) Prior Publication Data
US 2018/0352490 A1    Dec. 6, 2018

(51) Int. Cl.
*H04W 36/14* (2009.01)
*H04W 12/04* (2009.01)
(Continued)

(52) U.S. Cl.
CPC ........... *H04W 36/14* (2013.01); *H04W 12/04* (2013.01); *H04W 12/06* (2013.01);
(Continued)

(58) Field of Classification Search
CPC . H04W 36/14; H04W 36/0055; H04W 12/04; H04W 84/042; H04W 84/12; H04W 12/06
See application file for complete search history.

(56) References Cited

U.S. PATENT DOCUMENTS 7,350,077 B2 * 3/2008 Meier ................ G06Q 20/3674
713/171
8,553,643 B2 * 10/2013 Flore ................. H04W 36/0066
370/331

(Continued)

FOREIGN PATENT DOCUMENTS

| CN | 1630405 A | 6/2005 |
|---|---|---|
| CN | 101888630 A | 11/2010 |
| CN | 104853392 A | 8/2015 |

OTHER PUBLICATIONS

"$3^{rd}$ Generation Partnership Project; Technical Specification Group Services and System Aspects; 3GPP System Architecture Evolution (SAE); Security aspects of non-3GPP accesses (Release 12)," 3GPP TS 33.402 V12.5.0, pp. 1-56, (Dec. 2014).

(Continued)

*Primary Examiner* — Jay P Patel
(74) *Attorney, Agent, or Firm* — Fay Sharpe LLP

(57) ABSTRACT

Embodiments provide a user equipment (UE) device that includes a processor and a transceiver. The processor is configured to direct a handover request to an evolved packet core (EPC) access node via the transceiver. The access node may be, e.g. a wireless local area network (WLAN) access point or an E-UTRAN access point. The handover request may initiate a transfer of connectivity of the UE device from the WLAN access point to the E-UTRAN access point, or from the E-UTRAN access point to the WLAN access point. The processor is configured to receive a handover response from the current access node, wherein the response includes a cryptographic key identifier, and to derive a handover key from the key identifier. The processor may then operate the UE device to provide connectivity based on the handover key between the UE device and the other of the access nodes.

20 Claims, 5 Drawing Sheets

(51) Int. Cl.
  *H04W 12/06* (2009.01)
  *H04W 36/00* (2009.01)
  *H04W 84/12* (2009.01)
  *H04W 84/04* (2009.01)

(52) U.S. Cl.
  CPC ...... *H04W 36/0055* (2013.01); *H04W 84/042* (2013.01); *H04W 84/12* (2013.01)

(56) References Cited

U.S. PATENT DOCUMENTS

| | | | |
|---|---|---|---|
| 9,179,380 B1* | 11/2015 | Sitaram | H04W 36/08 |
| 9,241,261 B2* | 1/2016 | He | H04L 63/1441 |
| 2007/0217427 A1* | 9/2007 | Chung | H04L 12/4641 |
| | | | 370/395.2 |
| 2008/0019320 A1* | 1/2008 | Phan | H04W 36/02 |
| | | | 370/331 |
| 2010/0238799 A1* | 9/2010 | Sebire | H04M 15/8038 |
| | | | 370/225 |
| 2012/0082315 A1* | 4/2012 | Bai | H04L 9/0825 |
| | | | 380/272 |
| 2013/0010752 A1 | 1/2013 | Rydnell et al. | |
| 2014/0036873 A1* | 2/2014 | Cheng | H04W 36/0022 |
| | | | 370/331 |
| 2014/0080449 A1* | 3/2014 | Chen | H04W 12/04 |
| | | | 455/411 |
| 2015/0269028 A1* | 9/2015 | Horn | H04W 12/04 |
| | | | 714/4.1 |
| 2017/0134996 A1* | 5/2017 | Wang | H04W 12/04 |
| 2017/0318508 A1* | 11/2017 | Berglund | H04W 36/0072 |

OTHER PUBLICATIONS

"3$^{rd}$ Generation Partnership Project; Technical Specification Group Services and System Aspects; 3G security; Network Domain Security (NDS); IP network layer security (Release 12)," 3GPP TS 33.210 V12.2.0, pp. 1-24, (Dec. 2012).

J Arkko et al., "Improved Extensible Authentication Protocol Method for 3$^{rd}$ Generation Authentication and Key Agreement (EAP-AKA')," Network Working Group, pp. 1-29, May 2009.

3$^{rd}$ Generation Partnership Project; Technical Specification Group Services and System Aspects; 3GPP System Architecture Evolution (SAE); Security architecture (Release 13), 3GPP TS 33.401 V13. 3.0, pp. 1-148, (Jun. 2016).

3$^{rd}$ Generation Partnership Project; Technical Specification Group Services and System Aspects; Architecture enhancements for non-3GPP accesses (Release 13), 3GPP TS 23.402 V13.4.0, pp. 1-298, (Dec. 2015).

International Search Report for PCT/CN2015/094911 dated Aug. 8, 2016.

* cited by examiner

HANDOVER BETWEEN E-UTRAN AND WLAN

TECHNICAL FIELD

The present invention relates generally to the field of wireless communications, and, more particularly, but not exclusively, to methods and apparatus for transitioning a user equipment device between a wireless cellular network and a wireless local area network.

BACKGROUND

This section introduces aspects that may be helpful to facilitate a better understanding of the inventions. Accordingly, the statements of this section are to be read in this light and are not to be understood as admissions about what is in the prior art or what is not in the prior art. Any techniques or schemes described herein as existing or possible are presented as background for the present invention, but no admission is made thereby that these techniques and schemes were heretofore commercialized, or known to others besides the inventors.

A mobile device, such as a mobile handset, or more generally user equipment (UE), may connect via cellular access points to an internet protocol (IP) transport layer such as an evolved packet core (EPC) to communicate with other networked devices. To reduce loading of cellular network access points, such as E-UTRAN nodes (eNodeB), such devices may transition from a connection with a cellular access point to a connection with a wireless LAN (WLAN) access point that provides a data path between the IP transport layer and the UE. This transition requires several communication steps between the UE and servers within the EPC infrastructure. These steps may be time consuming, thereby requiring significant system resources when the actions of many UEs are considered as a whole.

SUMMARY

The inventors disclose various apparatus and methods that may be beneficially applied to, e.g., mixed cellular/WLAN data networks. While such embodiments may be expected to provide improvements in performance and/or reduction of cost of such apparatus and methods, no particular result is a requirement of the present invention unless explicitly recited in a particular claim.

One embodiment provides an apparatus, e.g. a user equipment (UE) device such as a mobile handset, including a processor, and a memory and a transceiver coupled to the processor. The processor is configured to execute instructions stored in the memory that when executed configure the processor to implement steps to change connectivity of the UE device from a WLAN access point to a E-UTRAN access point, or vice versa. Thus the processor is configured to provide initial connectivity via a transceiver between the user equipment (UE) device encompassing the processor and a first evolved packet core (EPC) access node of a first type, e.g. the E-UTRAN access point. The processor is further configured to detect a presence of a second EPC access node of a second type, e.g. the WLAN access point. The processor is further configured to direct a handover request to the first EPC access node, and to receive a handover response from the first access node, wherein the response includes a cryptographic key identifier. The processor is further configured to derive a handover cryptographic key from the key identifier, and to provide connectivity between the UE device and the second access node based on the handover key.

In some embodiments, e.g. in which the first EPC access node is the E-UTRAN access point. The handover request includes an identity of the UE and an identity of the WLAN access point. In some embodiments providing connectivity based on the handover key includes deriving a master session key set based on the handover key. In some embodiments the handover key comprises a pairwise master key based on the key identifier.

Another embodiment provides an apparatus, e.g. an E-UTRAN including an eNodeB, that includes a processor, and a memory and a transceiver coupled to the processor. The processor is configured to execute instructions stored in the memory that when executed configure the processor to perform steps to support changing connectivity of a UE device from the E-UTRAN access point to a WLAN access point. The processor is configured to receive via the transceiver a handover request from the UE device, and to direct the handover request to a mobility management entity (MME). The processor is further configured to receive a handover response from the MME, wherein the response including a cryptographic key identifier, and to direct the handover response to the UE. In some embodiments the handover request includes an identity of the UE device and a network access identifier of the WLAN access point. In some embodiments the handover response includes a cryptographic key identifier.

Another embodiment provides an apparatus, e.g. an E-UTRAN including an eNodeB, that includes a processor, and a memory and a transceiver coupled to the processor. The processor is configured to execute instructions stored in the memory that when executed configure the processor to perform steps to support changing connectivity of a UE device from a WLAN access point to an E-UTRAN access point. The processor is configured to receive via the transceiver a handover key negotiation request from a mobility management entity (MME), and in response to direct a key negotiation response to the MME. The processor is further configured to receive from a UE device a message that indicates the UE has completed, in response to receiving the key negotiation response, a handover from a wireless local area network access point to an E-UTRAN that encompasses the processor. In some embodiments the processor is further configured to derive a set of handover keys from a key received with the handover key negotiation request, and to include the handover keys with the key negotiation response. In some embodiments the handover key negotiation request includes an identity of the UE device.

Another embodiment provides an apparatus, e.g. a WLAN access point, that includes a processor, and a memory and a transceiver coupled to the processor. The processor is configured to execute instructions stored in the memory that when executed configure the processor to perform steps to support changing connectivity of a UE device from an E-UTRAN access point to a WLAN access point. The processor is configured to receive a handover key negotiation request from an AAA server, and in response, to direct a handover key negotiation message to the AAA server. The processor is further configured to receive a handover complete message from a UE that results from the handover key negotiation response, and thereafter to provide connectivity between the UE and an evolved packet core network. In some embodiments the handover key negotiation request includes an identity of a user equipment device requesting a handover of connectivity from an E-UTRAN access point to a wireless local area network access point that encompasses the processor. In some embodiments the handover key negotiation request further includes a master session key (MSK) and an extended master session key (EMSK). In some embodiments the processor is further configured by the instructions to direct a message to the AAA server informing the AAA server that a WLAN access point that encompasses the processor is ready to provide connectivity between the UE and an evolved packet core network.

Another embodiment provides an apparatus, e.g. a WLAN access point, that includes a processor, and a memory and a transceiver coupled to the processor. The processor is configured to execute instructions stored in the memory that when executed configure the processor to perform steps to support changing connectivity of a UE device from a WLAN access point to an E-UTRAN access point. The processor is configured to direct a handover request to an AAA server, and to receive a handover response from the AAA server. The processor is further configured to direct the handover response to a UE device in response to receiving the handover response, and to discontinue providing connectivity between the UE device and an evolved packet core. In some embodiments the processor is further configured to direct the handover request toward the AAA server in response to receiving a request from the UE device to handover, from a WLAN access point that encompasses the processor to an E-UTRAN access point, connectivity between the UE device and an evolved packet core. In some embodiments the handover response includes a custom key set index, and the processor is configured to direct the custom key toward to the UE device with the handover response.

Various additional embodiments include methods of manufacturing a WLAN access point consistent with embodiments described above.

Various additional embodiments include methods of manufacturing an E-UTRAN access point consistent with embodiments described above.

Various additional embodiments include methods of manufacturing a UE device consistent with embodiments described above.

BRIEF DESCRIPTION OF THE DRAWINGS

A more complete understanding of the present invention may be obtained by reference to the following detailed description when taken in conjunction with the accompanying drawings, wherein.

ABBREVIATIONS

Figure 1:
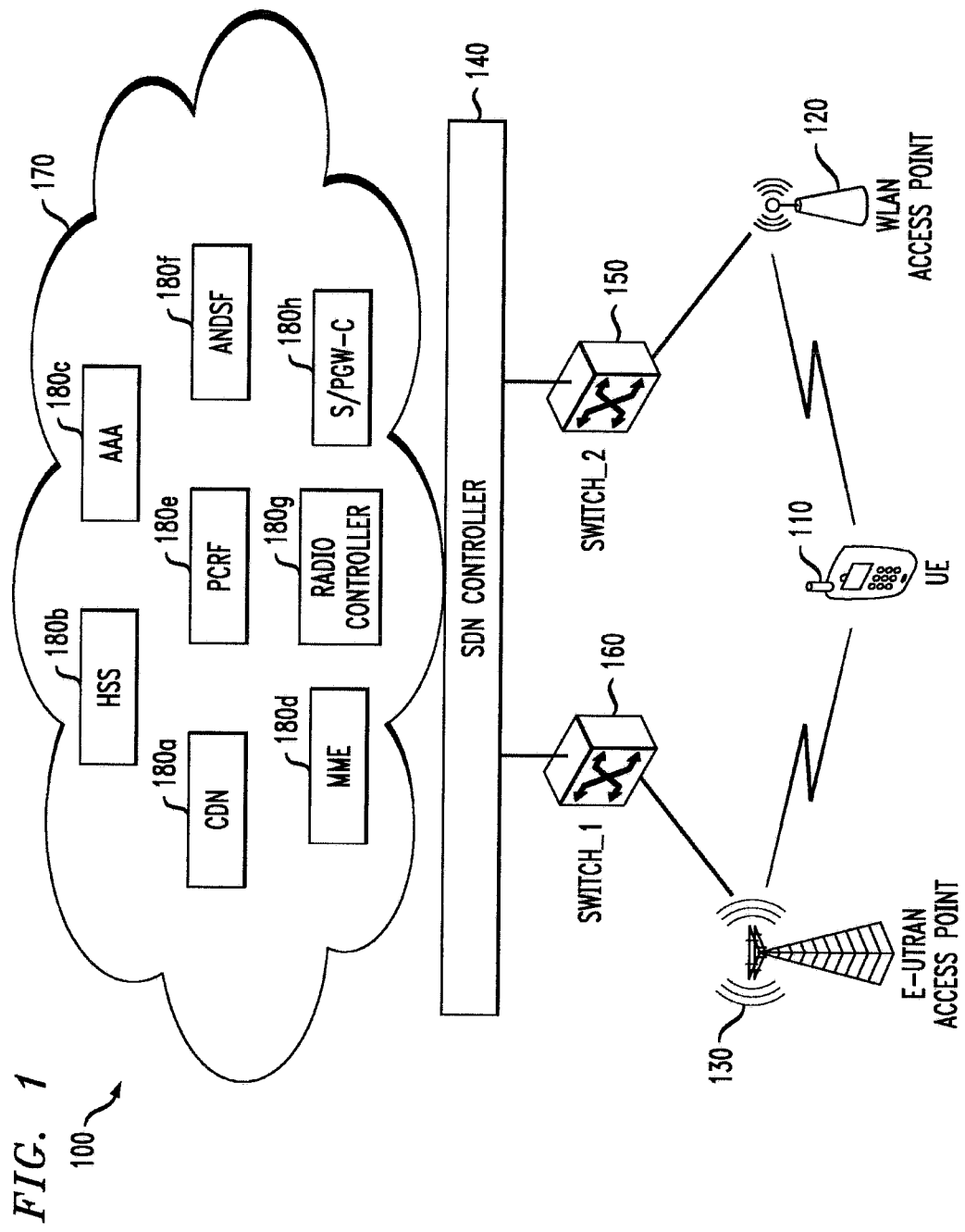
FIG. 1 illustrates an embodiment a mixed cellular wireless and WLAN system, in which an SDN controller mediates access of a user equipment (UE) device to a 3GPP evolved packet core network via an EUTRAN and a WLAN.

The following abbreviations used in the discussion are collected here for ease of reference:
3GPP: Third Generation Partnership Project
AAA: authentication, authorization, and accounting server
ANDSF: Access network discovery and selection function
CDN: Content Delivery Network
E-UTRAN: Evolved UTRAN
EMSK: Extended Master Session Key
EPS: Evolved Packet System
GTP: GPRS Tunneling Protocol
HSS: Home Subscriber Server
IMEA: International Mobile station Equipment Identity
IMSI: International Mobile Subscriber Identity
IPsec: Internet Protocol security
$K_{ASME}$: Mobility Management Entity base key; a base key
MAC: Media Access Control
MME: Mobility Management Entity
MSK: Master Session Key
NAI: Network Access Identifier
NFV: Network Function Virtualization
PCRF: Policy and Charging Rules Function
PMK: Pairwise Master Key
S/PGW(C): Serving/Packet-Data Network Gateway
SDN: Software Defined Network
TLS: Transport layer security
TSK: Temporary Session Key
TWAN: Trusted WLAN
UE: User Equipment
UMTS: Universal Mobile Telecommunications System
UTRAN: UMTS Terrestrial Radio Access Network
VNF: Virtualized Network Function
WLAN: wireless local area network
WLCP: WLAN control protocol

Technical Standards

Each of the following technical standards, relevant to the following description, is known to those skilled in the pertinent art and incorporated by reference in its entirety:
IEEE 802.11i-2004
IETF RFC 3748
IETF RFC 5448
3GPP TS23.402
3GPP TS33.210
3GPP TS33.220
3GPP TS33.401
3GPP TS33.402

DETAILED DESCRIPTION

Various embodiments are now described with reference to the drawings, wherein like reference numbers are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

Embodiments described herein address some shortcomings of conventional techniques by, e.g. exploiting software defined network (SDN) and network function virtualization (NFV) capabilities to provide efficient procedures of authentication and key negotiation for the mobility between 3GPP and non-3GPP accesses in order to save radio resource and reduce handover latency. For example, advantages of such embodiments over conventional operation include more efficient procedures of key negotiation for handover between E-UTRAN and WLAN. Consequently, communications between UE and network through the air link are significantly reduced.

Relevant 3GPP standards require that a UE and an evolved packet core (EPC) network be mutually authenticated before the UE can be handed off between 3GPP radio access (e.g. via an eNodeB) and non-3GPP radio access (e.g. via a WLAN). See, e.g. 3GPP TS33.402. After successful mutual authentication, the corresponding keys will be obtained and used to protect 3GPP radio access or non-3GPP radio access. For example, EAP-AKA, as defined in IETF RFC5448, may be done for mutual authentication between a UE and a 3GPP AAA server when the UE transition from an EPS E-UTRAN access point to WLAN radio access point. After successful mutual authentication, two keys MSK and EMSK, as defined in IETF RFC5448, may be derived and used to generate WLCP keys, as defined in 3GPP TS23.402 and TS33.402, and corresponding keys to protect WLAN radio access, as defined in 3GPP TS33.402. In another example, when the UE transitions from the WLAN to the EPS E-UTRAN, EPS AKA as defined in 3GPP TS33.401 may be done for mutual authentication between the UE and the MME. After that, corresponding keys will be derived to protect the communication between UE and eNodeB.

There are at least the two following deficiencies with this approach:
1) Even though UE has already been authenticated by the source radio access network (RAN), mutual authentication between the UE and the target network has to be done again in order to obtain the keys used to protect the air link before handover, which will increase handover latency.
2) There are many communications between the UE and the target network through the 3GPP air link, which consume scarce radio resources.

Embodiments described herein may address these and/or other shortcomings of conventional techniques by, e.g. exploiting SDN and NFV capabilities to optimize the procedures of authentication and key negotiation for the mobility between 3GPP and non-3GPP network access in order to reduce use of radio resources and/or to reduce handover latency. Advantageously, some embodiments provide procedures of key negotiation for handover between E-UTRAN and WLAN that are more optimal than conventional procedures. Consequently, communications between the UE and network through the 3GPP air link are significantly reduced. Moreover, handover latency is reduced and radio access resources are saved.

Authentication and key negotiation for the mobility between 3GPP and non-3GPP accesses (e.g., WiMAX, WLAN, and CDMA-2000 HRPD) are defined in 3GPP TS33.402. In order to simplify the description, only authentication and key negotiation for the mobility between EPS E-UTRAN and WLAN with non-roaming is outlined as below. Moreover, only trusted WLAN access to EPC or as non-seamless offload is described. Those skilled in the pertinent art will immediately recognize that the described principles may be extended beyond E-UTRAN/WLAN mobility, e.g. 5G radio interworking with WLAN, without undue experimentation.

FIG. 1 shows one embodiment of a SDN/NFV-based framework 100 for 3GPP EPS E-UTRAN interworking with a WLAN. A UE device 110, e.g. a mobile handset, tablet computer, laptop computer or similar device capable of communicating with a WLAN access point and an E-UTRAN access point, may be in radio frequency (RF) communication with a WLAN access point (AP) 120 and/or an E-UTRAN AP 130. The WLAN AP 120 may communicate with an SDN controller 140 via a switch 150, and the E-UTRAN AP 130 may communicate with the SDN controller 140 via a switch 160. A network includes virtualized network functions (VNFs) 180 in a control layer deployed in a "cloud" 170. Those skilled in the pertinent art will appreciate that the cloud 170 is an abstraction representative of a potentially vast number of devices interconnected via internet protocol. In particular the cloud 170 may be implemented in the EPS and broader connectivity to the worldwide web. Several VNFs 180 are shown, including a CDN 180a, HSS 180b, AAA server 180c (briefly AAA 180c), MME 180d, PCRF 180e, ANDSF 180f, RC 180g and S/PGW-C 180h. In other embodiments the cloud 170 may include other VNFs 180 in addition to those shown, while in yet other embodiments, some of the illustrated VNFs 180 may not be included. These VNFs, together with the SDN Controller 140, may operate to negotiate keys for UE handover between the E-UTRAN AP 130 and the WLAN AP 120. Such implementations make it possible to efficiently implement the handover.

The NFV implementation provides lower cost and more agile delivery of security services than alternative approaches, e.g. fixed network function servers. A VNF may be implemented by one or more virtual machines running different software and processes, on top of standard high-volume servers, switches and storage, or even cloud computing infrastructure, instead of having custom hardware appliances for each network function. Such functions can be deployed inexpensively and quickly, and the approach is highly scalable. Moreover, in the event of a hardware or network failure functionality may be re-established quickly by replacing one VNF with another, e.g. by reconfiguring an available server. An SDN controller, such as the SDN controller 140, may be provisioned with knowledge of the relevant network topology. Security policies can be simultaneously and consistently configured for all network equipment relevant to the inter-operability of the VNFs. Moreover, the SDN controller 140 may be configured to detect and mitigate network attacks automatically in a real time together with some security functions like automated security management. See, e.g. Z. Hu, et al., "A Comprehensive Security Architecture for SDN", 18$^{th}$ international Conference on Intelligence in Next Generation Networks, IEEE, 2015, pp 30-37, incorporated herein by reference.

Figure 2:
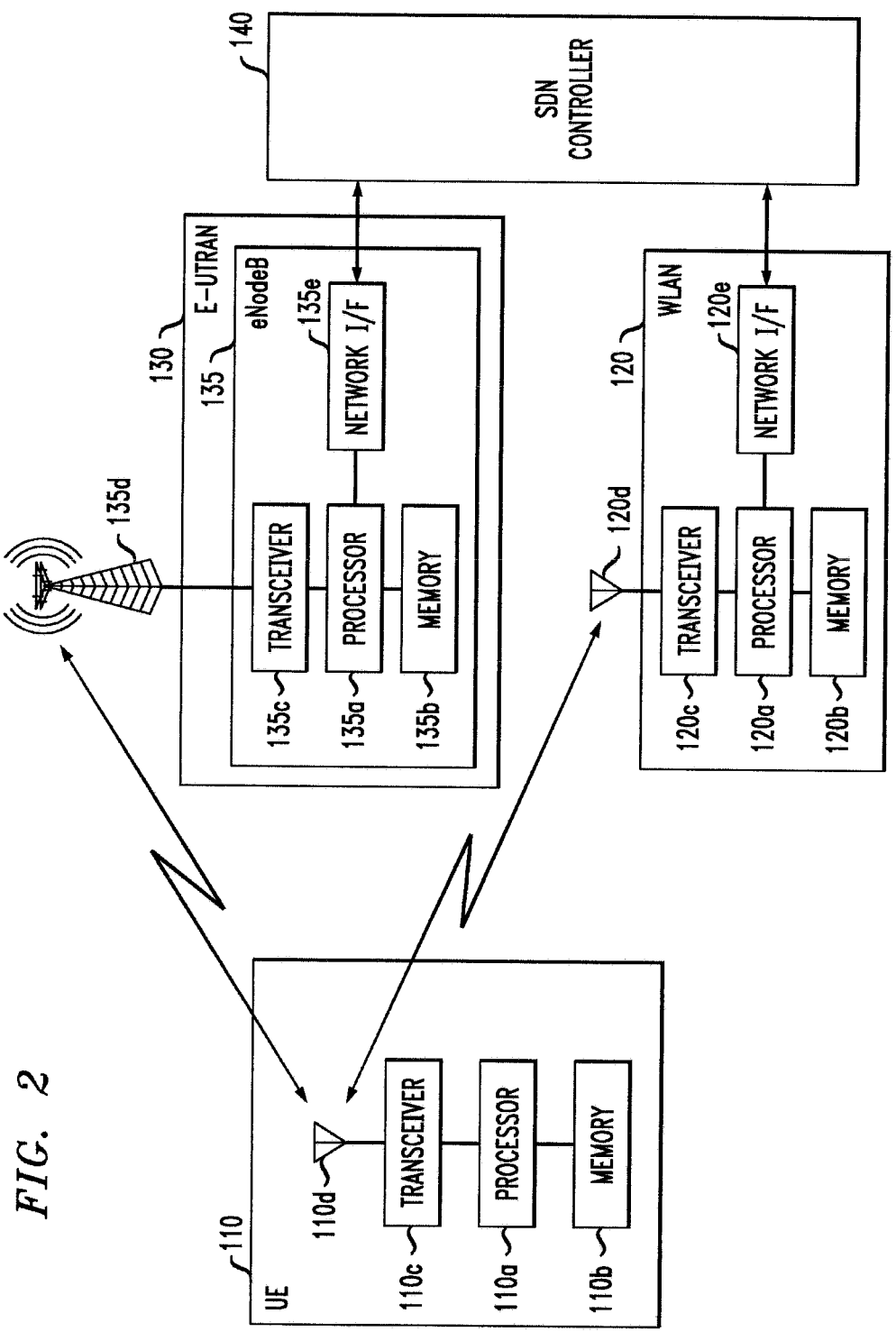
FIG. 2 illustrates a detailed view of aspects of the UE, EUTRAN and WLAN of FIG. 1.

FIG. 2 illustrates features of some of the components of the framework 100, e.g. the UE 110, the WLAN AP 120 and the E-UTRAN AP 130 with an associated eNodeB 135. The UE 110 includes a processor 110a configured to communicate locally with a memory 110b and a transceiver 110c. By "communicate locally", it is meant that the processor 110a is configured to communicate with the memory 110b and the transceiver 110c by direct, ohmic connections, e.g. wires, circuit boards the like, without an air gap. The transceiver 110c is further coupled to an antenna 110d. The memory 110b includes instructions, e.g. a program, that when executed by the processor 110a configure the processor 110a to perform various actions as described in embodiments herein. The processor 110a communicates with the transceiver 110c to send and/or receive messages and/or packet data to the WLAN AP 120 and the eNodeB 135. The UE 110 may communicate wirelessly via the antenna 110*d* with the WLAN AP 120 and the E-UTRAN AP 130 by use of a radio-frequency signal.

The WLAN AP 120 includes a processor 120*a* configured to communicate locally with a memory 120*b*, a transceiver 120*c* and a network interface 120*e*. The transceiver 120*c* is further coupled to an antenna 120*d*. The memory 120*b* includes instructions, e.g. a program, that when executed by the processor 120*a* configure the processor 120*a* to perform various actions as described in embodiments herein. The processor 120*a* communicates with the transceiver 120*c* to send and/or receive messages and/or packet data to the UE 110 via the antenna 120*d* and to the SDN controller 140 via the network interface 120*e*.

The eNodeB 135 includes a processor 135*a* configured to communicate locally with a memory 135*b*, a transceiver 135*c* and a network interface 135*e*. The transceiver 135*c* is further coupled to an antenna 135*d*. The memory 135*b* includes instructions, e.g. a program, that when executed by the processor 135*a* configure the processor 135*a* to perform various actions as described in embodiments herein. The processor 135*a* communicates with the transceiver 135*c* to send and/or receive messages and/or packet data to the UE 110 via the antenna 135*d* and to the SDN controller 140 via the network interface 135*e*.

Figure 3:
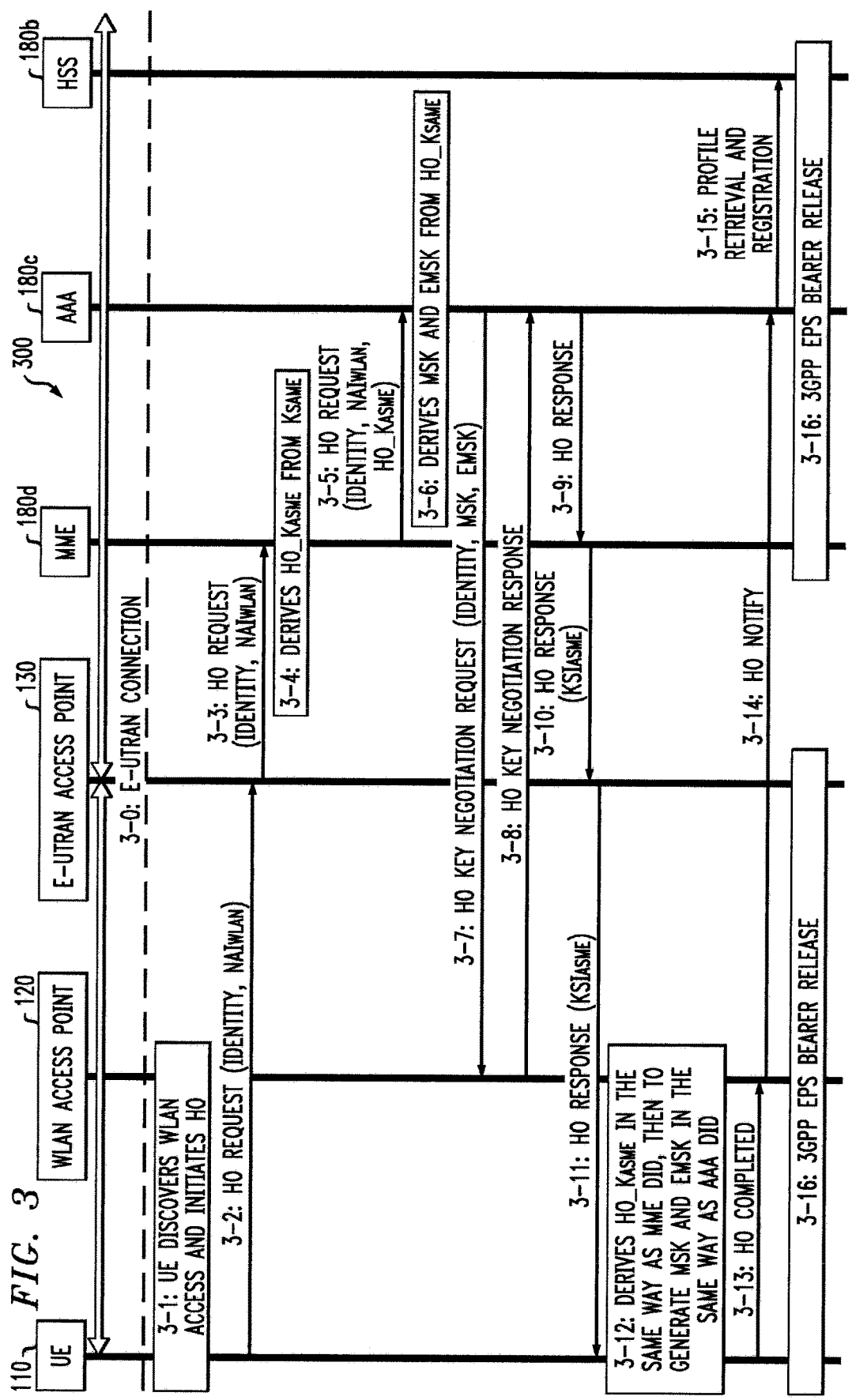
FIG. 3 illustrates an embodiment of key negotiation for handover from the EPS E-UTRAN to the WLAN of FIG. 1.
Figure 4:
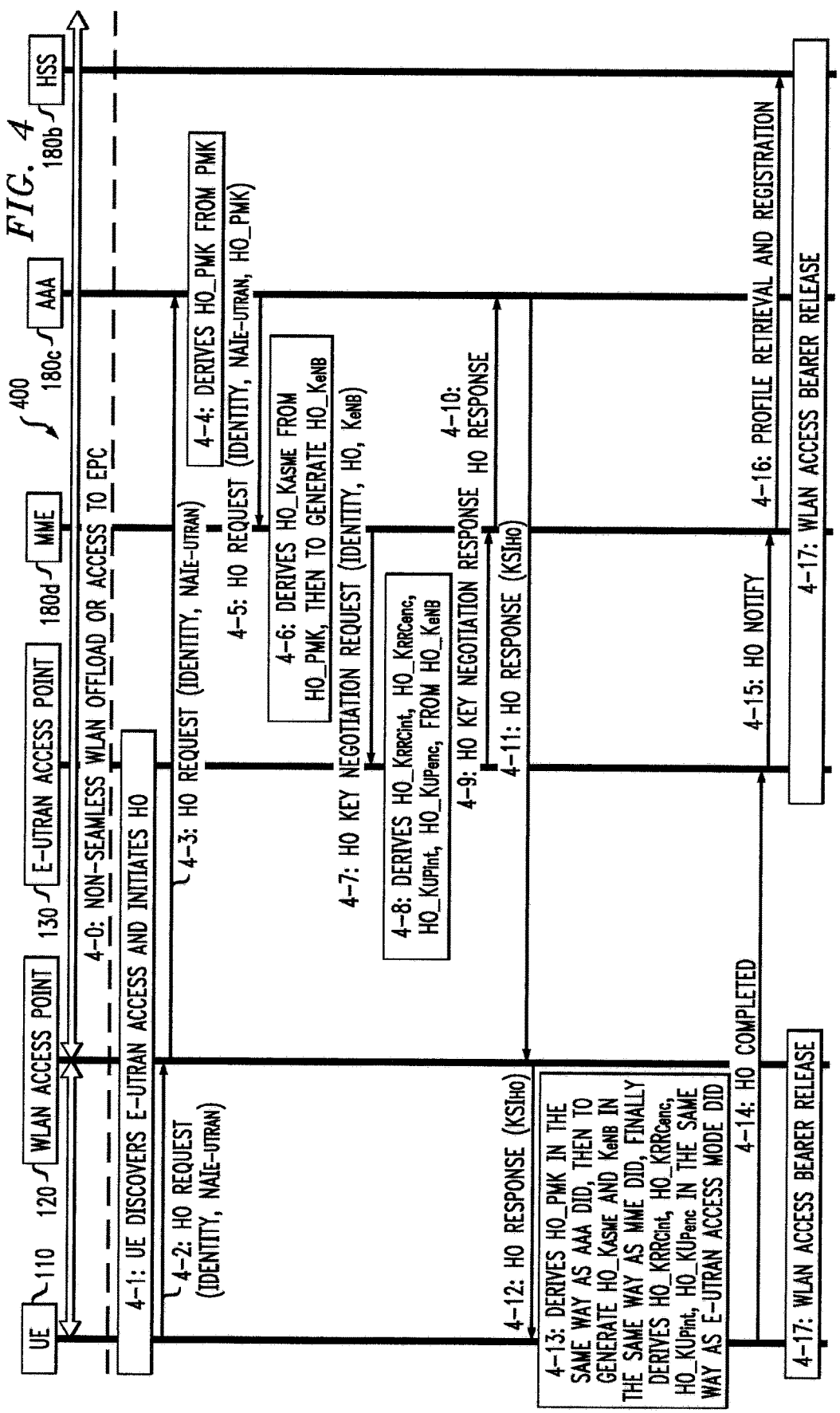
FIG. 4 illustrates an embodiment of key negotiation for handover from the WLAN to the EPS E-UTRAN of FIG. 1.

FIGS. 3 and 4 below present two embodiments that respectively describe procedures for handover between the E-UTRAN AP 130 and the WLAN AP 120. In various embodiments key negotiations for these handovers are implemented in a manner that is more efficient, e.g. consumes fewer wireless resources, than conventional methodologies, e.g. such as those that conform to the 3GPP TS33.402 and 3GPP TS23.402 technical standards. The following embodiments are based on the following assumptions, made to simplify the presentation, without limitation to the scope of the disclosure or the claims:

- The WLAN AP 120 and the EPS E-UTRAN AP 130 are trusted to each other, e.g. as defined in 3GPP TS23.402.
- Handover between the EPS E-UTRAN AP 130 the WLAN AP 120 is performed in a single-connect mode without roaming.
- Communication between the WLAN AP 120 and the switch 150, and between the E-UTRAN AP 130 and the switch 160, is secured by TLS/IPsec or physical security.
- Communication between each switch 150, 160 and the SDN controller 140 is secured by TLS/IPsec or physical security.
- Both the E-UTRAN AP 130 and the WLAN AP 120 access nodes have the ability to support key negotiation.

Based on the SDN controller 140, network functionalities such as the MME 180*d*, AAA 180*c* and HSS 180*b* may communicate with each other efficiently and securely. Thus, by exploiting SDN/NFV capabilities for 3GPP EPS E-UTRAN interworking with WLAN, communication between the UE 110 and the network for authentication and key negotiation is expected to be reduced sharply. Consequently, handover latency is reduced and radio access resources are saved.

FIG. 3 illustrates an embodiment of a method 300, e.g. of negotiating handover from an EPS E-UTRAN to a WLAN. The method 300 includes six actors, the UE 110, the WLAN AP 120, the E-UTRAN AP 130, the MME 180*d*, the AAA 180*c* and the HSS 180*b*. In the method 300, various messages and cryptographic keys may include the prefix "HO", designating that message or key as a "handover" message or key. In this presentation, the UE 110 is initially ("Step 0") connected to the EPC via the E-UTRAN AP 130. The following steps are conveniently presented in tabular form:

Step 3-1: the UE 110 discovers WLAN access is available via the WLAN AP 120.

Step 3-2: In response to this discovery, the UE 110 initiates a handover from the E-UTRAN AP 130 to the WLAN AP 120 by directing a handover (HO) request message HO_Request to the E-UTRAN AP 130. The request may be made, e.g., in response to detecting sufficient signal strength from the WLAN AP 120. The request includes an Identity parameter of the UE 110, e.g. an IMEA number, IMSI number, or MAC address, and an identity of the WLAN AP 120, e.g. a network access identifier parameter $NAI_{WLAN}$. The Identity and $NAI_{WLAN}$ parameters may be as defined in 3GPP TS23.402 and 3GPP TS33.402.

Step 3-3: In response to receiving the HO_Request message, the E-UTRAN AP 130 redirects this message to the MME 180*d*.

Step 3-4: The MME 180*d* determines a corresponding identifier, e.g. IMSI, and a key set identifier $KSI_{ASME}$ corresponding to the UE 110. This determination may be made, e.g. based on the Identity parameter contained in the request of Step 2. The MME 180*d* may derive a handover key $HO\_K_{ASME}$ based on the corresponding base key $K_{ASME}$ with $KSI_{ASME}$. Those skilled in the art are familiar with the key $K_{ASME}$ and key set identifier $KSI_{ASME}$. See, for example, 3GPP TS33.401. In some embodiments the MME 180*d* does not derive the key $HO\_K_{ASME}$, but instead sends the key $K_{ASME}$ to the AAA 180*c* directly. However, such embodiments may not be preferable in some cases, due to a possible potential security threat, in that the WLAN AP 120 may be able to determine the keys used to secure the wireless communication between the UE 110 and E-UTRAN AP 130.

Step 3-5: The MME 180*d* identifies the AAA 180*c* according to the parameter $NAI_{WLAN}$ originally provided by the UE 110, and then directs a message HO_Request (Identity, $NAI_{WLAN}$, $HO\_K_{ASME}$) to the identified AAA 180*c*.

Step 3-6: The AAA 180*c* derives keys MSK and EMSK from the key $HO\_K_{ASME}$. Details of the derivation are provided by, e.g. IETF RFC5448. This standard defines a key derivation function (KDF) for MSK and EMSK that assumes an input key "IK'|CK'" for a function PRF'. In the present embodiment, the key $HO\_K_{ASME}$ replaces IK'|CK' for the input key of the PRF' function.

Step 3-7: The AAA 180*c* directs to the WLAN AP 120 a handover key negotiation request, e.g. a message HO_Key_Negotiate_Request(Identity, MSK, EMSK).

Step 3-8: The WLAN AP 120 stores the keys MSK and EMSK which will be used to secure the communication between UE 110 and WLAN AP 120. The WLAN AP 120 directs to the AAA 180*c* a handover key negotiation response, e.g. a message HO_Key_Negotiate_Response.

Step 3-9: The AAA 180*c* sends a message HO_Response to the MME 180*d*.

Step 3-10. The MME 180*d* sends a message HO_Response($KSI_{ASME}$) to the E-UTRAN AP 130.

Step 3-11: The E-UTRAN AP 130 sends a message HO_Response($KSI_{ASME}$) to the UE 110.

Step 3-12: The UE 110 derives the key HO_K$_{ASME}$ in the same way as did the MME 180d, e.g. as specified in TS33.210. This derivation is described in the Appendix with K$_{ASME}$ as the input key. The UE 110 generates a master session key MSK and an extended master session key EMSK in the same way as did the AAA 180c in Step 6. The keys MSK and EMSK are collectively referred to herein and in the claims as a master session key set. Those skilled in the pertinent art will appreciate that the key HO_K$_{ASME}$ is directly analogous with the key K$_{ASME}$, which is an intermediate key conventionally shared between a UE and an MME.

Step 3-13: The UE 110 derives keys to secure the air link, e.g. a PMK and a TSK from the MSK, and a WLCP key from the EMSK. See, e.g., 3GPP TS33.402, IETF RFC3748 and IEEE 802.11i-2004. The UE 110 then connects to the WLAN AP 120 using the derived keys. The UE 110 then sends the message HO_Completed to the WLAN AP 120.

Step 3-14: The WLAN AP 120 sends the message HO Notify to the AAA 180c informing the AAA 180c that the WLAN AP 120 has established connectivity between the UE 110 and the EPC.

Step 3-15: The AAA 180c initiates a Subscriber Profile Retrieval and AAA Server registration to the HSS 18013.

Step 3-16: The resource is released in EPS E-UTRAN access.

FIG. 4 illustrates an embodiment of a method 400, e.g. of negotiating handover from a WLAN to an EPS E-UTRAN. The method 400 includes the six actors as described with respect to FIG. 4, the UE 110, the WLAN AP 120, the E-UTRAN AP 130, the MME 180d, the AAA 180c and the HSS 180b.

Figure 5:
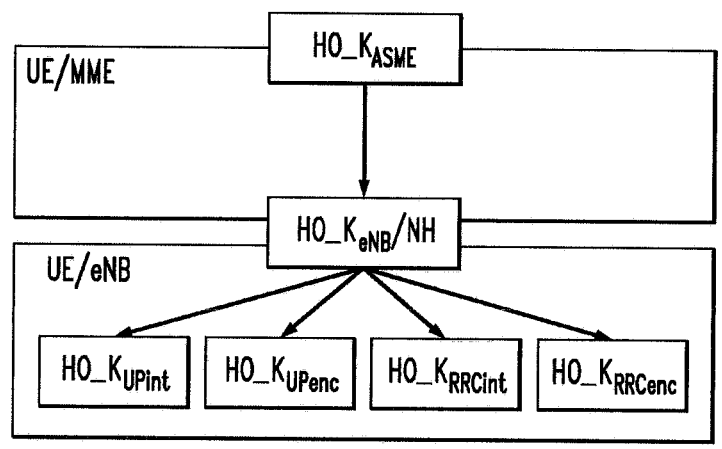
FIG. 5 schematically illustrates relationships between various keys that may be useful in understanding the various steps of the methods presented in FIGS. 3 and 4.

As before, in the method 400, the prefix "HO" designates a message or key as a handover message or key. The various actors in the method 400 derive all the keys necessary to provision the UE 110 and the eNodeB 135. These handover keys are directly analogous to the keys used to provision the various actors in conventional practice. Those skilled in the pertinent art will immediately recognize that these keys may be derived using procedures consistent with, e.g. standard document 3GPP TS33.401. FIG. 5 schematically illustrates, without limitation, relationships between various keys that may be useful in understanding the following steps. The MME 180d derives a key HO_K$_{ASME}$ from a pairwise master key HO_PMK received from the AAA 180c. The MME 180d then derives a key HO_K$_{eNB}$ from HO_K$_{ASME}$ and sends the latter key to the E-UTRAN AP 130. The E-UTRAN AP 130 then derives, from the HO_K$_{eNB}$ key, four additional keys: HO_K$_{RRCint}$, HO_K$_{RRCenc}$, HO_K$_{UPint}$, and HO_K$_{UPenc}$. These latter four keys are collectively referred to herein as "handover keys". Those skilled in the art will immediately recognize that the handover keys HO_K$_{UPint}$, and HO_K$_{UPenc}$ are directly analogous to user plane (UP) traffic keys K$_{UPenc}$ and K$_{UPint}$, described in the TS33.401 standard, and the keys HO_K$_{RRCint}$, HO_K$_{RRCenc}$ are directly analogous to the radio resource control (RRC) traffic keys K$_{RRCint}$ and K$_{RRCenc}$ described in the same standard.

Returning to FIG. 4, the UE 110 is initially ("Step 0") connected to the EPC via the WLAN AP 120. The following steps are again conveniently presented in tabular form:

Step 4-1: The UE 110 discovers the E-UTRAN AP 130 is available for access, and initiates a handover request. The request may be made, e.g., in response to detecting a loss of signal quality in the connection to the WLAN AP 120.

Step 4-2: The UE 110 directs a message HO_Request (Identity, NAI$_{E-UTRAN}$) to the WLAN AP 120. The parameters Identity and NAI$_{E-UTRAN}$ may be as defined in the 3GPP TS23.402 and 3GPP TS33.402 standards.

Step 4-3: The WLAN AP 120 forwards the HO_Request (Identity, NAI$_{E-UTRAN}$) message to the AAA 180c.

Step 4-4: The AAA 180c retrieves a PMK that corresponds to the UE 110 according to the Identity parameter. In some embodiments the AAA 180c then derives a key HO_PMK from the PMK key. In this context the key HO_PMK may also operate as a handover key. In some other embodiments the AAA 180c does not derive the key HO_PMK, but instead sends the key PMK to the MME 180d directly. However, in such embodiments there may be a potential security threat, in that the E-UTRAN AP 130 may learn the keys used to secure the wireless communication between the UE 110 and the WLAN AP 120. Thus in some implementations the previous embodiments may be more desirable. The derivation of the key HO_PMK may be performed as described in the Appendix.

Step 4-5: The AAA 180c identifies the MME 180d according to the parameter NAI$_{E-UTRAN}$. The AAA 180c sends a HO_Request(Identity, NAI$_{E-UTRAN}$, HO_PMK) message to the MME 180d.

Step 4-6: The MME 180d derives the key HO_K$_{ASME}$ from the key HO_PMK. The MME 180d derives the key HO_K$_{eNB}$ from the key HO_K$_{ASME}$. These key derivations may be performed as described in the Appendix, with the input key of the derivation method taken as HO_PMK and HO_K$_{ASME}$, respectively.

Step 4-7: The MME 180d sends an HO_Key_Negotiate_Request(Identity, HO_K$_{eNB}$) message to the E-UTRAN AP 130.

Step 4-8: The E-UTRAN AP 130 stores the key HO_K$_{eNB}$, and derives from the key HO_K$_{eNB}$ four additional keys, HO_K$_{RRCint}$, HO_K$_{RRCenc}$, HO_K$_{UPint}$, and HO_K$_{UPenc}$, collectively referred to herein and in the claims as handover keys. These handover keys will be used to secure the communication between UE 110 and the E-UTRAN AP 130. These key derivations may be performed as described in the Appendix, with the input key of the derivation method taken as HO_K$_{eNB}$.

Step 4-9: The E-UTRAN AP 130 sends a HO_Key_Negotiate_Response message to the MME 180d.

Step 4-10: The MME 180d sends an HO_Response message to the AAA 180c.

Step 4-11: The AAA 180c sends an HO_Response(KSI$_{HO}$) message to the WLAN AP 120. Note that the KSI$_{HO}$ key is not used in conventional implementations, and is introduced in this disclosure to signal to the UE 110 that the PMK is to be used to generate HO_K$_{ASME}$ in WLAN access. The KSI$_{HO}$ is generally referred to herein and in the claims as "custom key set index" to reflect its novelty over conventional practice. Of course, while the custom key set index may be referred to using different terminology while being equivalent in function, the nomenclature used here reflects the similarity of the function of the KSI$_{HO}$ to the conventional key set index KSI. A custom key set index is transmitted from the AAA 180c to the WLAN AP 120 for the purpose of configuring the WLAN AP 120 to operate as an EPC access point. A custom key set index is defined as a key set index that is not defined in a currently existing standard, e.g. the 3GPP standards, or more specifically, e.g. 3GPP TS23.402 and 3GPP TS33.402.

Step 4-12: The WLAN AP 120 forwards the HO_Response($KSI_{HO}$) message to the UE 110.

Step 4-13: The UE 110 derives a key HO_PMK from the PMK in the same way as was done by the AAA 180c. The UE 110 derives the key HO_$K_{ASME}$ from the key HO_PMK and derives the key HO_$K_{eNB}$ from the key HO_$K_{ASME}$ in the same manner as was done by the MME 180d. The UE 110 generates keys HO_$K_{RRCint}$, HO_$K_{RRCenc}$, HO_$K_{UPint}$, and HO_$K_{UPenc}$ in the same way as was done by the E-UTRAN AP 130. The derivations of the keys HO_PMK, HO_$K_{ASME}$, HO_$K_{eNB}$, HO_$K_{RRCint}$, HO_$K_{RRCenc}$, HO_$K_{UPint}$, and HO_$K_{UPenc}$ may be performed as described in the Appendix, with PMK, HO_PMK, HO_$K_{ASME}$ and HO_$K_{eNB}$ as for the input keys respectively.

Step 4-14: The UE 110 connects to the E-UTRAN AP 130 using the keys HO_$K_{RRCint}$, HO_$K_{RRCenc}$, HO_$K_{UPint}$, and HO_$K_{UPenc}$ to secure the link. The UE 110 sends an HO_Completed message to the E-UTRAN AP 130.

Step 4-15: The E-UTRAN AP 130 sends an HO Notify message to the MME 180d.

Step 4-16: The MME 180d initiates the Subscriber Profile Retrieval and the MME registration to the HSS 180b.

Step 4-17: WLAN access resources are released by all entities.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

The description and drawings merely illustrate the principles of the invention. It will thus be appreciated that those of ordinary skill in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, in conjunction with the appropriate computer hardware, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

APPENDIX: KEYS DERIVATION

Referring to B.2 of 3GPP TS33.220, a generic key derivation function is defined as below:

derivedKey=HMAC-SHA-256 (Key, S)
S=FC||P0||L0||P1||L1||P2||L2||P3||L3|| . . . ||Pn||Ln Where
FC is single octet used to distinguish between different instances of the algorithm,
P0 is a static ASCII-encoded string,
L0 is the two octet representation of the length of the P0,
P1 . . . Pn are the n input parameters, and
L1 . . . Ln are the two-octet representations of the length of the corresponding input parameters P1 . . . Pn.

According to the key derivation function (KDF) defined in clause B.2 of 3GPP TS33.220, all the Keys HO_PMK, $HO\_K_{ASME}$, $HO\_K_{eNB}$, $HO\_K_{RRCint}$, $HO\_K_{RRCenc}$, $HO\_K_{UPint}$, and $HO\_K_{UPenc}$ are defined as below:

HO_PMK=HMAC-SHA-256 (Key, S)
   S=FC||P0||L0
     FC=0x31[†]
     P0="ho_pmk"
     L0=length of P0 is 8 octets
$HO\_K_{ASME}$ HMAC-SHA-256 (Key, S)
   S=FC||P0||L0
     FC=0x32[†]
     P0="ho_kasme"
     L0=length of P0 is 8 octets.
$HO\_K_{eNB}$=HMAC-SHA-256 (Key, S)
   S=FC||P0||L0
     FC=0x33[†]
     P0="ho_kenb"
     L0=length of P0 is 8 octets.
$HO\_K_{RRCint}$=HMAC-SHA-256 (Key, S)
   S=FC||P0||L0
     FC=0x34[†]
     P0="ho_krrcint"
     L0=length of P0 is 8 octets
$HO\_K_{RRCenc}$=HMAC-SHA-256 (Key, S)
   S=FC||P0||L0
     FC=0x35[†]
     P0="ho_krrcenc"
     L0=length of P0 is 8 octets
$HO\_K_{UPint}$=HMAC-SHA-256 (Key, S)
   S=FC||P0||L0
     FC=0x36[†]
     P0="ho_kupint"
     L0=length of P0 is 8 octets.
$HO\_K_{UPenc}$=HMAC-SHA-256 (Key, S)
   S=FC||P0||L0
     FC=0x37[†]
     P0="ho_kupenc"
     L0=length of P0 is 8 octets

[†]These are example values that may be different in other particular implementations.

The invention claimed is:

1. An apparatus, comprising:
a transceiver;
a memory; and
a processor configured to execute instructions stored in said memory that when executed configure the processor to:
provide initial connectivity via said transceiver between a user equipment (UE) device encompassing said processor and a first evolved packet core (EPC) access node of a first type;
detect a presence of a second EPC access node of a second type;
direct a handover request to said first EPC access node;
receive a handover response from said first access node, the response including a cryptographic key set identifier;
derive a handover key from said key set identifier; and
provide connectivity between said UE device and said second access node based on said handover key.

2. The apparatus as recited in claim 1, wherein said first access node comprises an E-UTRAN access point, and said second access node comprises a wireless local area network (WLAN) access point.

3. The apparatus as recited in claim 2, wherein said handover request includes an identity of said UE and an identity of said WLAN access point.

4. The apparatus as recited in claim 1, wherein said first access node comprises a wireless local area network (WLAN) access point, and said second access node comprises an E-UTRAN access point.

5. The apparatus as recited in claim 4, wherein said handover request includes an identity of said UE device and an identity of said E-UTRAN access point.

6. The apparatus as recited in claim 1, wherein providing connectivity based on said handover key includes deriving a master session key set based on said handover key.

7. The apparatus as recited in claim 1, wherein said handover key comprises a pairwise master key based on said key identifier.

8. An apparatus, comprising:
a transceiver;
a memory; and
a processor configured to execute instructions stored in said memory that when executed configure the processor to:
receive via said transceiver a handover request from a user equipment (UE) device;
direct said handover request to a mobility management entity (MME);
receive a handover response from said MME, the response including a cryptographic key set identifier; and
direct said handover response to said UE.

9. The apparatus as recited in claim 8, wherein said handover request includes an identity of said UE device and a network access identifier of a wireless local area network (WLAN) access point.

10. The apparatus as recited in claim 8, wherein said handover response includes a cryptographic key identifier.

11. An apparatus, comprising:
a transceiver;
a memory; and
a processor configured to execute instructions stored in said memory that when executed configure the processor to:
receive via the transceiver a handover key negotiation request from a mobility management entity (MME);
direct a key negotiation response to said MME;
receive from a user equipment (UE) device a message generated in response to said key negotiation response that indicates said UE has completed a handover from a wireless local area network access point to an E-UTRAN that encompasses said processor; and
provide connectivity between said UE and an evolved packet core.

12. The apparatus as recited in claim 11, wherein said processor is further configured to derive a set of handover keys from a key received with said handover key negotiation request, and to include said handover keys with said key negotiation response.

13. The apparatus as recited in claim 11, wherein said handover key negotiation request includes an identity of said UE device.

14. An apparatus, comprising:
- a transceiver;
- a memory; and
- a processor configured to execute instructions stored in said memory that when executed configure the processor to:
  - receive a handover key negotiation request from a AAA server;
  - direct a handover key negotiation response to said AAA server;
  - receive a handover complete message from a UE; and
  - provide connectivity between said UE and an evolved packet core.

15. The apparatus as recited in claim 14, wherein said handover key negotiation request includes an identity of a user equipment device requesting a handover of connectivity from an E-UTRAN access point to a wireless local area network access point that encompasses said processor.

16. The apparatus as recited in claim 15, wherein said handover key negotiation request further includes a master session key (MSK) and an extended master session key (EMSK).

17. The apparatus as recited in claim 14, wherein said processor is further configured by said instructions to direct a message to the AAA server informing the AAA server that a WLAN access point that encompasses said processor is ready to provide connectivity between said UE and an EPC.

18. An apparatus, comprising:
- a transceiver;
- a memory; and
- a processor configured to execute instructions stored in said memory that when executed configure the processor to:
  - direct a handover request to a AAA server;
  - receive a handover response from said AAA server;
  - direct said handover response to a user equipment (UE) device in response to receiving said handover response; and
  - discontinue providing connectivity between said UE device and an evolved packet core.

19. The apparatus as recited in claim 18, wherein said processor is further configured to direct said handover request toward said AAA server in response to receiving a request from said UE device to handover connectivity between said UE device and an evolved packet core to an E-UTRAN access point from a WLAN access point that encompasses said processor.

20. The apparatus as recited in claim 18, wherein said handover response includes a custom key set index, and said processor is configured to direct said custom key set index toward to the UE device with said handover response.

* * * * *